United States Patent
Kvassheim

[11] Patent Number: 5,331,148
[45] Date of Patent: Jul. 19, 1994

[54] METHOD AND A DEVICE FOR THE RECORDING OF NUMBER AND SIZE CLASSIFICATION OF OBJECTS, PARTICULARLY LIVE FISH

[76] Inventor: Torbjorn Kvassheim, Gosenstien 1, N-4041 Hafrsfjord, Norway

[21] Appl. No.: 835,972
[22] PCT Filed: Aug. 8, 1990
[86] PCT No.: PCT/NO90/00128
§ 371 Date: Feb. 11, 1992
§ 102(e) Date: Feb. 11, 1992
[87] PCT Pub. No.: WO91/03029
PCT Pub. Date: Mar. 7, 1991

[30] Foreign Application Priority Data
Aug. 14, 1989 [NO] Norway .................. 893253

[51] Int. Cl.[5] .................. G01V 9/04
[52] U.S. Cl. .................. 250/221; 250/560; 356/379
[58] Field of Search .......... 250/221, 223 R, 560; 356/376, 379

[56] References Cited
U.S. PATENT DOCUMENTS
3,040,980  6/1962  Mann et al. .......... 250/221
4,012,622  3/1977  Boys .
4,628,520 12/1986  Menger .
5,142,160  8/1992  Storbeck .......... 250/560

FOREIGN PATENT DOCUMENTS
207567    1/1987   European Pat. Off. .
0358627   3/1990   European Pat. Off. .
60-213805 10/1985  Japan .
892812    9/1989   Norway .
8802097   3/1988   PCT Int'l Appl. .
8906842   7/1989   PCT Int'l Appl. .
1410980  10/1975   United Kingdom .
1571889   7/1980   United Kingdom .

Primary Examiner—David C. Nelms
Assistant Examiner—Que T. Le
Attorney, Agent, or Firm—Andrus, Sceales, Starke & Sawall

[57] ABSTRACT

A device for the recording of number and size classification of objects, wherein the objects pass between a light source (1) and an objective (3)/CCD-line camera (2) further transmitting data to a signal processing card (4). The signal processing card (4) is connected to a PC-card (5) which executes calculations of the measured data for the determination of the number of objects as well as size classification. When classifying by size, the PC-card (5) also gives signals to an actuator (7) controlling flaps (8) guiding the objects to appropriate channel/chute.

24 Claims, 1 Drawing Sheet

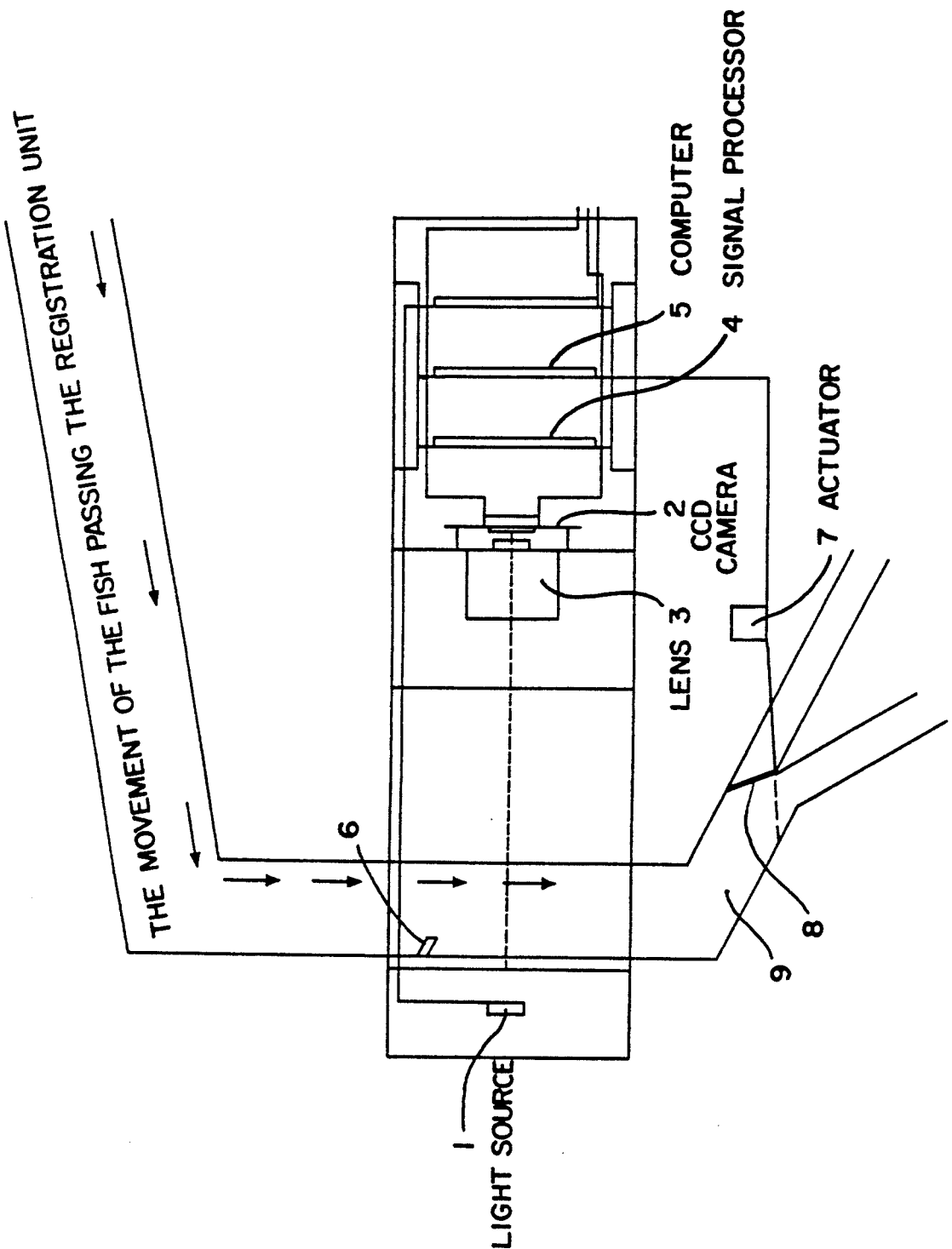

METHOD AND A DEVICE FOR THE RECORDING OF NUMBER AND SIZE CLASSIFICATION OF OBJECTS, PARTICULARLY LIVE FISH

TECHNICAL FIELD

The current invention comprises a method and a device for the recording of the number and size classification of objects, particularly live fish.

PRIOR ART

Intensive production of fish (breeding of fish) is a rapidly growing trade. It is anticipated that its importance still will grow strongly in extent. In connection with the intensive production of fish, the recording of number of fish and the size classification of fish are frequently required.

Sale of live fish is usually done on the basis of number and, as a sale may comprise several hundreds of thousands, the execution of a rapid and accurate recording of fish number becomes of great importance. In order to achieve the largest possible growth, it is important regularly to carry out size classification of the fish such that the size variation in the different storage vessels is kept at a limited amount. The individual fishes grow with varying speed, and larger fish restrict the growth of smaller fish kept in the same vessel.

There are several methods for the counting and size classification of live fish. Usually, the counting of fish is performed manually. However, several devices for the automatic recording of number have emerged recently. These automatic counting devices are characterized in that they require a distance between adjacent objects, in order to achieve an accurate recording of number. This requirement restricts the capacity of the devices substantially. For the size classification of live fish, a series of different methods are used, e.g. using rotary rollers having an uniformly ascending slot, or using several gratings having varying slot widths. Common to these methods is that the size classification occurs on the basis of the thickness of the fish. A number of fish species, such as e.g. turbot, halibut and other flounders, exhibit great variations in the proportion between thickness and size/weight.

Both when recording the fish number and when classifying fish by size, the fish have to be treated as non-injuriously as possible.

DESCRIPTION OF THE INVENTION

The object of the current invention is to provide a method and a device of the kind mentioned above, which is accurate, non-injurious to the fish, a minimum time of residence in air, and which has a high capacity.

The single FIGURE of the drawing shows one embodiment of the device and method of the present invention.

According to the invention, its objects are achieved through measuring the area of the fish when they are falling freely. Each fish falls between a light source (1) and a CCD-line camera (2) associated with an objective lens (3), and the fish will then form a shadow area which is conceived by the CCD-camera. A signal processing card (4) records and stores data conceived by the CCD-line camera. These recorded data are further read by a computing-card (5) which executes calculations. The area recorded is influenced both through the size of the object and its speed at the time of recording. In order that objects having the same size shall be recorded with the same shadow area, it is necessary that the objects have the same speed. According to the invention, this is achieved in that the objects fall freely from a certain height. In case several objects pass the lens simultaneously, e.g. laterally of each other, the computer-card will calculate the number of objects on the basis of a recorded mean value of single objects. In contrast with other known principles of counting, this principle does not require a distance between adjacent objects.

Prior to using the device for counting, the user decides a probable mean value through executing test measurements of individual objects or through the use of stored and already known values, and what permissible variation on either side of this value that is to be estimated as individual objects. This tolerance is determined on the basis of the existing variation by size for objects to be recorded. If the objects have the same size, then the tolerance is determined to be approximately equal to zero. In connection with the counting of fishes wherein the sizes of the individual fishes vary, the tolerance values should vary about 30% on either side of the mean value. Objects smaller or larger than this interval will be estimated as noise (the recording is rejected) or as two or more objects, respectively. For each individual object recorded, i.e. the area recorded is within the specified tolerance values, the mean value will be corrected. All recorded areas of objects determined to be single objects, are continuously accumulated and divided by the number of the individual objects recorded. Thus, the mean value calculated when the counting is terminated, will be most correct—more correct the more single objects being recorded. This ultimate calculated mean value is then used in order to calculate the number of fish recorded to be "consecutive". These "consecutive" areas are accumulated in order to calculate the number on the basis of this ultimate recorded mean value. Number of fish incorporated into this accumulated "consecutive" area, is calculated on the basis of the last calculated mean value.

Thus, the total number of fish is the sum of the number of individual fish and estimated number of "consecutive" fish. As the device performs calculation of the number of objects also in the case of "consecutive" objects wherein e.g. two "consecutive" objects form a shadow area which is approximately the double of the area recorded for individual objects, spacing between adjacent objects is not required for the achievement of an accurate recording of the number. In order to obtain the best accuracy possible, the method requires that the objects fall facing the same side toward the objective lens/CCD-line camera. In the case of recording the number of fish, this means that the fish falls facing the belly/back or profile toward the objective lens/CCD-line camera. Through the mounting of soft brush ledges (6) in the slot wherein the objects are recorded, the narrower side of the objects will always face in the direction of fall and the widest toward the objective lens/CCD-line camera.

As the device according to the invention makes the recording of the area of the objects, these data would give a description of the size of the objects—a small object will be recorded with a smaller area than a larger object. These data describing the area of the object are, as previously mentioned, transmitted to the computer-card which, moreover, transmits an off/on-signal to one or more actuators (7). The actuator controls one or more flaps (8), so that objects of the same size group are guided to the same outlet. The specified limits for the various size groups are stored in the computer-card. In the case of classification of objects, the method requires a spacing between the objects. Spacing between the objects is achieved through accelerating the objects in a uniformly sloping chute (9).

The described invention is in no way limited to the embodiments shown, but may be realised in various ways without departing from the main idea described above.

I claim:

1. A method for counting live fish to obtain the number thereof, said method including the steps of:

moving the fish, generally in seriatim, along a path, each of the fish moving at generally the same speed; adjacent, individual fish in the path being spaced from each other in the path or overlapping one another in the path;

placing the fish in a given orientation as they move along the path;

measuring the size of the area of the oriented, moving fish presented in a plane parallel to the direction of movement of the fish in the path;

establishing at least one preselected parameter of fish area size;

ascertaining the number of measured fish having an area size meeting the preselected area size parameter, said ascertained number being taken as the number of individual fish that are spaced from each other along the path;

determining a mean area size for the measured fish meeting the preselected area size parameter;

accumulating a totalized area size for fish measurements in which the area size of the fish is greater than the preselected area size parameter;

determining the number of fish represented by said accumulated totalized area size by dividing same by the mean area size, said number being taken as an indication of the number of fish overlapping one another along the path; and adding the number so determined to the number of fish having an area size meeting the preselected area size parameter to obtain the total number of fish.

2. A method as defined in claim 1 wherein the step of moving the fish is further defined as moving the fish in a generally unsupported manner by allowing the fish to freely fall in air from a predetermined height.

3. A method as defined in claim 1 wherein the fish may be oriented so as to present a greater area size in one position than in the position and wherein the step of placing the fish in a given orientation is further defined as placing the fish in said one position.

4. A method as defined in claim 1 wherein the step of establishing the preselected fish area size parameter is further defined as selecting a given fish area size and as altering said given fish area size by a size variation tolerance to establish the preselected fish area size parameter.

5. A method as defined in claim 4 wherein the step of establishing the preselected fish area size parameter is further defined as altering the given fish area size by a size tolerance of up to about 30%.

6. A method as defined in claim 4 wherein the step of establishing the preselected fish area size parameter is further defined as altering the given fish size by a size tolerance greater than the given fish size and a size tolerance smaller than the given fish size to provide a range of fish area sizes.

7. A method as defined in claim 6 wherein the step of ascertaining the number of measured fish meeting the preselected area size parameter is further defined as ascertaining the number of measured fish falling within the range of fish area sizes.

8. A method as defined in claim 1 wherein the step of determining the mean area size is further defined as continuously determining the mean area size as the counting method is carried out and wherein the step of determining the number of fish represented by said accumulated totalized area is further defined as applying the last mean area size value to the totalized area.

9. The method according to claim 1 further including the step of classifying the fish according to the size measurement thereof.

10. The method according to claim 9 further including the step of accelerating the movement of the fish after measuring the size of the fish and before classifying the fish.

11. Apparatus for counting live fish to obtain the number thereof, said apparatus comprising:

means for forming a path along which the fish may move, said fish moving generally in seriatim and at the same speed; adjacent, individual fish in the path being spaced from each other in the path or overlapping one another in the path;

means for placing each of the fish in a given orientation as they move along the path forming means;

means for measuring the size of the area of the oriented, moving fish presented in a plane parallel to the direction of movement of the fish;

comparison means coupled to said measuring means for comparing the area size of the fish with a preselected fish area size parameter to ascertain the number of measured fish having an area size meeting the preselected area size parameter, said ascertained number being taken as the number of individual fish that are spaced along the path;

means for determining a mean area size for the measured fish meeting the preselected area size parameter;

means for accumulating a totalized area size for fish measurements in which the area size of the fish is greater than the preselected area size parameter;

means for dividing the totalized area size by the mean area size to determine the number of fish represented by said accumulated totalized area size, said number being taken as an indication of the number of fish overlapping along the path; and adding means for adding the number so determined to the number of fish having an area size meeting the preselected area size parameter to obtain the total number of fish.

12. An apparatus as defined in claim 11 wherein said measuring means comprises photo detection means.

13. An apparatus as defined in claim 12 wherein said measuring means comprises an optical recording unit having a light source on one side of said path and a CCD-camera means disposed on the other side of said path such that the fish pass between said light source and said camera.

14. An apparatus as defined in claim 11 wherein said comparison means, determining means, accumulating means, applying means, and adding means comprise a digital computer.

15. The apparatus according to claim 11 further including means for classifying the fish according to the size measurement thereof.

16. An apparatus according to claim 11 wherein said path forming means comprises a generally vertical shaft through which the live fish fall freely in air.

17. An apparatus as defined in claim 11 wherein said orienting means comprise brush means extending into said path upstream of said measuring means.

18. The apparatus according to claim 15 further including means for accelerating the movement of the fish upstream of said classification means.

19. A method for counting live fish to obtain the number thereof, said method including the steps of:
   moving the fish, generally in seriatim, along a path, each of the fish moving at generally the same speed;
   placing the fish in a given orientation as they move along the path;
   measuring the size of the area of the oriented, moving fish presented in a plane parallel to the direction of movement of the fish in the path;
   accumulating a totalized area size for the fish measurements;
   establishing a parameter indicative of the area size of an individual fish; and
   determining the number of fish represented by accumulated totalized area size by dividing same by the area size parameter.

20. A method as defined in claim 19 wherein the step of establishing the area size parameter is further defined as establishing a parameter comprising the mean area size of an individual fish.

21. A method as defined in claim 20 wherein the step of establishing a parameter comprising the mean area size of an individual fish is further defined as averaging the sizes of individual fish moving the path.

22. Apparatus for counting live fish to obtain the number thereof, said apparatus comprising:
   means forming a path along which the fish may move, said fish moving generally in seriatim and at the same speed;
   means for placing the fish in a given orientation as they move along the path;
   means for measuring the size of the area of the oriented, moving fish presented in a plane parallel to the direction of movement of the fish in the path;
   means for accumulating a totalized area size for the fish measurements;
   means for establishing a parameter indicative of the area size of an individual fish; and
   divider means for dividing the accumulated totalized area size by the area size parameter to determine the number of fish.

23. An apparatus as defined in claim 22 wherein the means for establishing the area size parameter is further defined as means for establishing a parameter comprising the mean area size of an individual fish.

24. An apparatus as defined in claim 23 wherein the means for establishing a parameter comprising the mean area size of an individual fish is further defined as means for averaging the sizes of individual fish moving in the path.

* * * * *